United States Patent
Sundman et al.

(10) Patent No.: US 10,721,017 B2
(45) Date of Patent: Jul. 21, 2020

(54) METHODS AND TRANSCEIVERS FOR WIRELESS COMMUNICATION IN A PACKET BASED COMMUNICATION NETWORK

(71) Applicant: Telefonaktiebolaget LM Ericsson (publ), Stockholm (SE)

(72) Inventors: Dennis Sundman, Solna (SE); Miguel Lopez, Solna (SE); Nafiseh Shariati, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/082,773

(22) PCT Filed: Mar. 9, 2016

(86) PCT No.: PCT/SE2016/050186
§ 371 (c)(1),
(2) Date: Sep. 6, 2018

(87) PCT Pub. No.: WO2017/155435
PCT Pub. Date: Sep. 14, 2017

(65) Prior Publication Data
US 2019/0115999 A1    Apr. 18, 2019

(51) Int. Cl.
*H04L 1/00* (2006.01)
*H04W 48/20* (2009.01)
(Continued)

(52) U.S. Cl.
CPC .......... *H04L 1/0025* (2013.01); *H04L 1/0003* (2013.01); *H04L 1/0009* (2013.01);
(Continued)

(58) Field of Classification Search
CPC combination set(s) only.
See application file for complete search history.

(56) References Cited

U.S. PATENT DOCUMENTS

2005/0245198 A1* 11/2005 Brignol ................. H04L 1/0003
455/70
2010/0054141 A1  3/2010 Youn et al.
(Continued)

FOREIGN PATENT DOCUMENTS

EP    1594243 A1    11/2005
WO    2014066785 A1    5/2014

OTHER PUBLICATIONS

Unknown, Author, "Fast Link Adaptation", Next Generation Wireless, Chapter 15, 440-444.
(Continued)

*Primary Examiner* — Junpeng Chen
(74) *Attorney, Agent, or Firm* — Sage Patent Group (57) ABSTRACT

A method is disclosed performed by a second transceiver (140) of a packet based wireless communication network (100) for wireless communication with a first transceiver (130) of the network. The method comprises receiving, from the first transceiver (130), a data sequence comprising a first data field comprising data coded with a first modulation and coding scheme, MCS, and a second data field comprising data coded with a second MCS different from the first MCS, wherein the second transceiver (140) has information indicating that the data of the first data field is coded with the first MCS and the data of the second data field is coded with the second MCS. The method further comprises performing a decoding operation on the data of the first data field using the first MCS and a decoding operation on the data of the second data field using the second MCS, and selecting the first MCS or the second MCS based on a result of the performed decoding operations. Thereby a most suitable MCS can be efficiently found for communication between a first and a second transceiver.

8 Claims, 9 Drawing Sheets

(51) Int. Cl.
*H04W 72/12* (2009.01)
*H04W 84/12* (2009.01)

(52) U.S. Cl.
CPC .......... *H04L 1/0015* (2013.01); *H04L 1/0036* (2013.01); *H04L 1/0041* (2013.01); *H04W 48/20* (2013.01); *H04W 72/1231* (2013.01); *H04W 84/12* (2013.01)

(56) References Cited

U.S. PATENT DOCUMENTS

2013/0286959 A1 10/2013 Lou et al.
2014/0169195 A1 6/2014 Hsin et al.
2015/0036573 A1 2/2015 Malik et al.

OTHER PUBLICATIONS

Unknown, Author, "Linux Wireless", http://linuxwireless.org/en/developers/Documentation/mac80211/RateControl/minstrel, accessed Oct. 27, 2015, 1-7.
Unknown, Author, "Part 11: Wireless LAN Medium Access Control (MAC) and Physical Layer (PHY) Specifications", IEEE P802.11ah™/D5.0, Mar. 2015, 1-632.
Unknown, Author, "Part 11: Wireless LAN Medium Access Control (MAC) and Physical Layer (PHY) Specifications Amendment 4: Enhancements for Very High Throughput for Operation in Bands below 6 GHz", IEEE Std 802.11ac (Amendment to IEEE Std 802.11-2012, as amended by IEEE Std 802.11ae-2012, IEEE Std 802.11aa-2012, and IEEE Std 802.11ad-2012), 2013, 1-425.

\* cited by examiner

| STF+LTF | SIG field | MCS 1 | MCS 2 | .... | MCS N |

Fig. 8a

| STF+LTF | SIG field | Delim. 1 | MPDU1 MCS1 | Delim. 2 | MPDU2 MCS2 | ... | Delim. N | MPDU N MCS N |

Fig. 8b

| STF+LTF | SIG 1 | PSDU1 MCS1 | SIG 2 | PSDU2 MCS2 | ... | SIG N | PSDU N MCS N |

METHODS AND TRANSCEIVERS FOR WIRELESS COMMUNICATION IN A PACKET BASED COMMUNICATION NETWORK

TECHNICAL FIELD

The present disclosure relates generally to methods and transceivers for wireless communication in a packet based communication network. The present disclosure further relates to computer programs configured for enabling such wireless communication and carriers containing such computer programs.

BACKGROUND

In a wireless communication network, data is transmitted wirelessly from a transmitter to a receiver. For example, in the Wireless Local Area Network technology, WLAN, data is transmitted from a wireless access point to a wireless communication device, called downlink communication, or from the wireless communication device to the wireless access point, called uplink communication. Data may also be transmitted peer-to-peer, i.e. directly between wireless communication devices. The data that is transmitted may be coded with different modulation and coding schemes, MCS, depending on the current communication conditions, such as signal to noise ratio, SNR. In good communication conditions, e.g. high SNR, a more advanced MCS may be used than in communication conditions having lower SNR. For example with a 64 Quadrature Amplitude Modulation, QAM, scheme, 6 data bits may be transmitted in one QAM symbol whereas for 16QAM only 4 information bits may be transmitted in one QAM symbol.

There is a need to find the most suitable MCS for wireless communication between a transmitter and a receiver, depending on the communication conditions. This may also be called link adaptation, i.e. to adapt the wireless link between the transmitter and the receiver.

Figure 1:
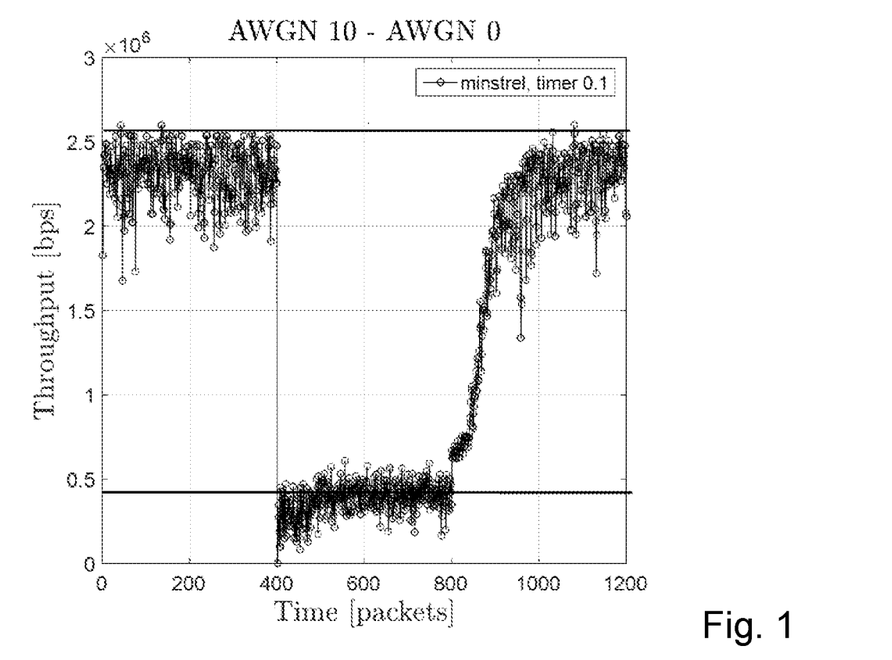
FIG. 1 is an x-y diagram illustrating throughput over time for a prior art method.

There are different known methods for link adaptation. One such method is based on the Minstrel algorithm. The Minstrel algorithm is described on the following Internet homepage: http://linuxwireless.org/en/developers/Documentation/mac80211/RateControl/minstrel. The minstrel algorithm keeps in a memory a table of MCS and throughput statistics for individual receivers in the network, and uses this table to choose the MCS that historically has provided the best throughput for the individual receiver. However, in order to update the table, other MCSs than the best are also sampled and used. This algorithm works well when there is lots of data being transmitted, e.g. more than hundreds of packets, and when the channel conditions are static, or slowly varying. With the growing interest in Internet of Things, one focus is on communication devices that are sensor stations, STA. A sensor STA may be sleeping for long periods of time, e.g. up to years, wake up, transmit some data and going back to sleep. Sensor STA's are typically battery powered and therefore choosing the correct MCS as soon as possible is important, not to waste battery power. Since such long time may have passed since the sensor STA was waken last time, the channel conditions may be completely different. Since the Minstrel algorithm is based on statistics attained through many packets, this algorithm is insufficient for such sensor STAs. An example of the convergence of the Minstrel algorithm is shown in FIG. 1. As shown, a lot of data samples are needed before the algorithm converges to a correct data, in this example correct throughput. Consequently, the minstrel algorithm is not feasible for wireless devices that wake up seldom. Other examples of interest where the Minstrel algorithm may fail can be in vehicle to vehicle or vehicle to infrastructure (V2X) communication. Here the communication devices may or may not be asleep, but certainly the environment may change rapidly.

In the WLAN standards 802.11n and future standards, there is a possibility for a receiver to suggest an MCS to the transmitter using an MCS feedback field in the HT Control field. This is described in the IEEE standard 802.11—2012, "Part 11: Wireless LAN Medium Access Control (MAC) and Physical Layer (PHY) Specifications", section 9.28.2 Using the MCS feedback, the challenge is for the receiver to estimate which MCS to suggest for the feedback. One alternative is to estimate the SNR of a previously transmitted packet and use this SNR estimate to choose the right MCS. However, the problem with this approach is firstly that estimating SNR accurately is not trivial; and secondly, the SNR does not give the full picture of the channel conditions. There are other alternatives to estimate the MCS based on link quality, for example using mutual information or Received Signal Strength Indication, RSSI, but they all suffer from the challenge of providing accurate estimates. An MCS estimate based on SNR and/or channel estimates is in fact dependent on the MCS used for the signal on which the SNR or channel estimate was made. This is due to the Error Vector Magnitude, EVM, requirements, which vary with the MCS. For example, suppose that a received packet is Binary phase-shift keying, BPSK, modulated, and the estimated SNR based on this packet is 20 dB. However, had the packet been 64QAM modulated, assuming same propagation environment, the estimated SNR would have been lower, say 12 dB. In this example the transmitter must back off 10 dB in order to fulfill the EVM requirements for 64 QAM. Note also that the difference in SNR cannot be explained only by the difference in TX powers, as higher output powers usually introduce non-linear distortions in the transmitted signal.

Consequently, there is a need for a better way for selecting MCS to use for wireless communication between a transmitter and a receiver, especially to find a solution that works well for communication devices that are only seldom awake, such as sensor stations.

SUMMARY

It is an object of the invention to address at least some of the problems and issues outlined above. It is an object of at least some embodiments to easily and/or quickly find a suitable modulation and coding scheme for wireless communication between a sender and a receiver. It is possible to achieve these objects and others by using methods and transceivers as defined in the attached independent claims.

According to one aspect, a method is provided performed by a second transceiver of a packet based wireless communication network for wireless communication with a first transceiver of the network. The method comprises receiving, from the first transceiver, a data sequence comprising a first data field comprising data coded with a first MCS, and a second data field comprising data coded with a second MCS different from the first MCS, wherein the second transceiver has information indicating that the data of the first data field is coded with the first MCS and the data of the second data field is coded with the second MCS. The method further comprises performing a decoding operation on the data of the first data field using the first MCS and a decoding operation on the data of the second data field using the second MCS, and selecting the first MCS or the second MCS based on a result of the performed decoding operations.

According to another aspect, a method is provided performed by a first transceiver of a packet based wireless communication network for wireless communication with a second transceiver of the network. The method comprises transmitting, to the second transceiver, a data sequence comprising a first data field comprising data coded with a first modulation and coding scheme, MCS, and a second data field comprising data coded with a second MCS different from the first MCS, and receiving, from the second transceiver, information of an MCS of the first MCS or the second MCS to use for communication between the first transceiver and the second transceiver.

According to another aspect, a second transceiver is provided operable in a packet based wireless communication network configured for wireless communication with a first transceiver of the network. The second transceiver comprises a processor and a memory. Said memory contains instructions executable by said processor, whereby the second transceiver is operative for receiving, from the first transceiver, a data sequence comprising a first data field comprising data coded with a first modulation and coding scheme, MCS, and a second data field comprising data coded with a second MCS different from the first MCS, wherein the second transceiver has information indicating that the data of the first data field is coded with the first MCS and the data of the second data field is coded with the second MCS. The second transceiver is further operative for performing a decoding operation on the data of the first data field using the first MCS and a decoding operation on the data of the second data field using the second MCS, and selecting the first MCS or the second MCS based on a result of the performed decoding operations.

According to another aspect, a first transceiver is provided operable in a packet based wireless communication network configured for wireless communication with a second transceiver of the network. The first transceiver comprises a processor and a memory. The memory contains instructions executable by said processor, whereby the first transceiver is operative for transmitting, to the second transceiver, a data sequence comprising a first data field comprising data coded with a first modulation and coding scheme, MCS, and a second data field comprising data coded with a second MCS different from the first MCS, and receiving, from the second transceiver, information of an MCS of the first MCS or the second MCS to use for communication between the first transceiver and the second transceiver.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to efficiently find a suitable modulation and coding scheme to be used for wireless communication between a first transceiver and a second transceiver. This may be achieved by the first transceiver sending a data sequence to the second transceiver, the data sequence comprising a first data part that is coded with a first MCS and a second data part that is coded with a second MCS. The second transceiver receives the data sequence, and based on information of how the data parts of the data sequence were coded, the second receiver attempts to decode the first data part using the first MCS and the second data part using the second MCS. Based on the results of the attempted decoding, the second transceiver selects the MCS that resulted in the best decoded data, or the most efficiently decoded data. Hereby, a good selection of MCS may be performed only from one received data sequence. The data sequence may of course comprise more than two data parts, each data part being coded with a different MCS. In an embodiment, the second transceiver then informs the first transceiver of the selected MCS. The first transceiver may then start communicating with the second transceiver using the selected MCS. In another embodiment, the second transceiver, which may be a wireless device, may receive and attempt to decode similar data sequences from more than one transceiver, which may be a wireless access point or base station. The second transceiver may then select to communicate with the transceiver, e.g. access point, which MCS resulted in the best, or most efficient decoding.

Figure 2:
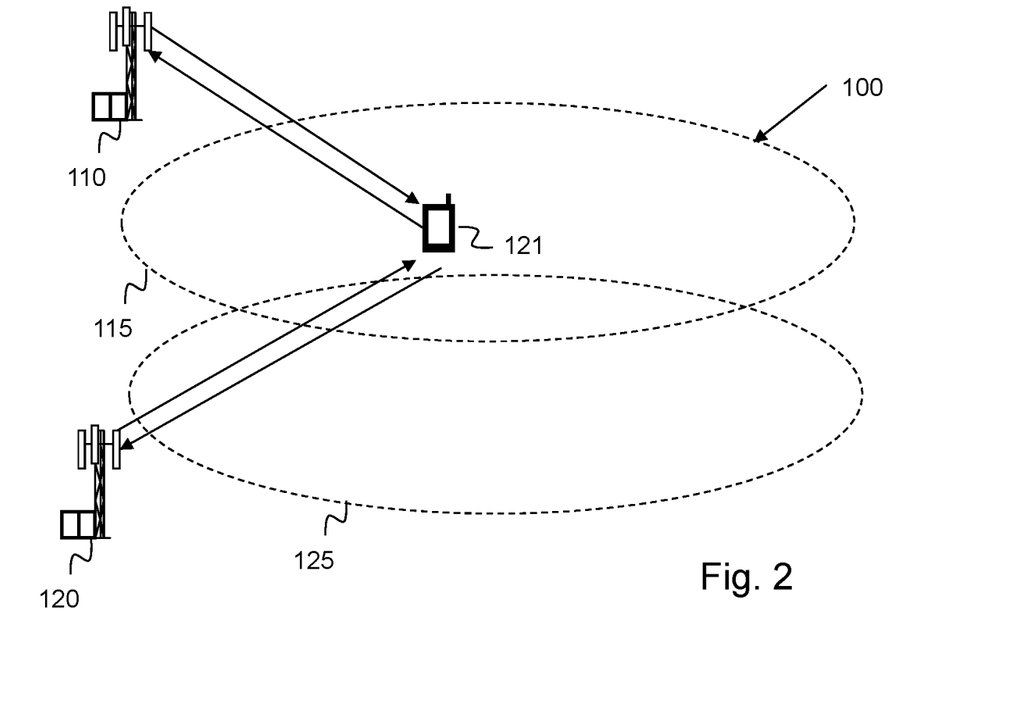
FIG. 2 is a schematic figure illustrating a wireless communication network in which the present invention may be used.

FIG. 2 shows a wireless communication network 100 comprising a first base station or access point 110 providing wireless access to wireless devices communication devices such as communication device 121 residing in a cell 115. The cell may in a Wifi context be called a basic service set, BSS. The wireless communication network further comprises a second base stations or access point 120 providing wireless access to wireless communication devices residing in a cell 125. At least some of the following exemplary embodiments may be implemented in such a communication network. The wireless communication network may be any kind of wireless network such as a Wifi network based on e.g. any IEEE 802.11 standard or a Long Term Evolution, LTE network or any of its predecessors or evolutions.

Figure 3:
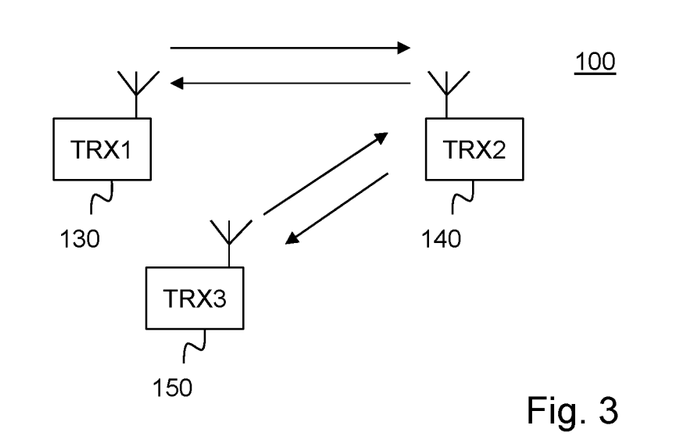
FIG. 3 is a schematic block diagram illustrating wireless communication between two transceivers.

FIG. 3 shows a more general communication scenario in which the following exemplary embodiments may be implemented. The communication scenario of FIG. 3 shows a wireless communication network 100 comprising a first transceiver, TRX 130 and a second TRX 140 that may communicate wirelessly with each other. The network 100 may also comprise a third TRX 150 arranged for communication with the second TRX 140.

Figure 4:
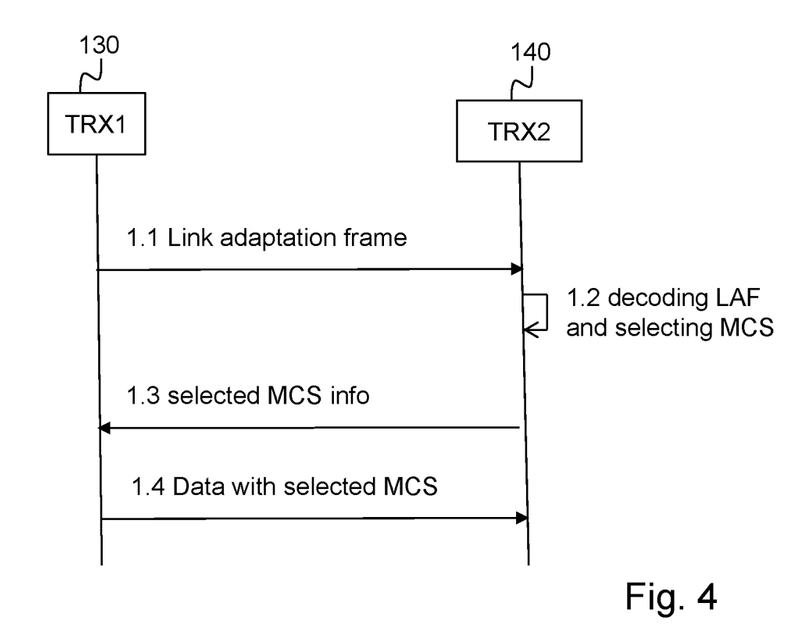
FIG. 4 is a signaling diagram illustrating a method according to possible embodiments.

FIG. 4, in conjunction with FIG. 3, illustrates a procedure according to an embodiment. In accordance with the procedure, the TRX 130 sends 1.1 to the second TRX 140 a link adaptation frame, LAF, comprising first data coded with a first MCS and second data coded with a second MCS. The first TRX may also send information of the coding, i.e. that the first data is coded with the first MCS and the second data is coded with the second MCS to the second TRX 140, i.e. in a header of the LAF. The second TRX 140 attempts to decode 1.2 the received LAF by performing a decoding operation on the first data using the first MCS and a decoding operation on the second data using the second MCS. The second TRX 140 selects the most appropriate MCS to use for communication between the first TRX and the second TRX based on the result of the decoding operations. The second TRX may then send 1.3 information of the selected MCS to the first TRX 130. The first TRX then responds by sending further data to the second TRX 140 using the selected MCS.

Figure 5:
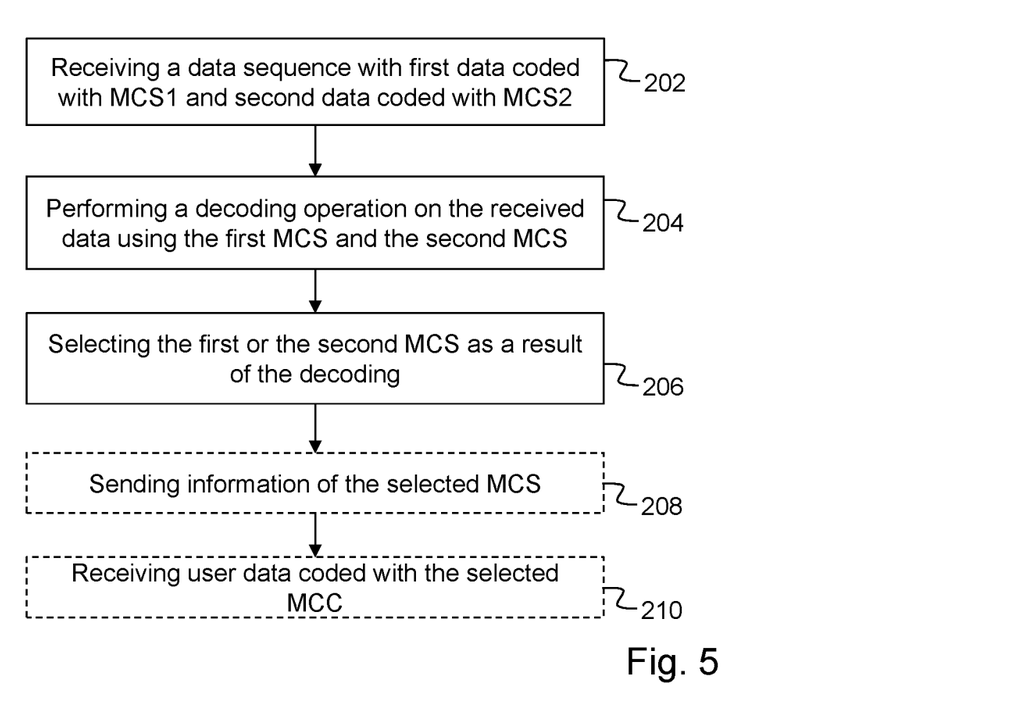
FIG. 5 is a flow chart illustrating a method performed by a second transceiver, according to possible embodiments.

FIG. 5, in conjunction with FIG. 2 or 3, describes a method performed by a second transceiver 121, 140 of a packet based wireless communication network 100 for wireless communication with a first transceiver 110, 130 of the network. The method comprises receiving 202, from the first transceiver 110, 130, a data sequence comprising a first data field comprising data coded with a first MCS, and a second data field comprising data coded with a second MCS different from the first MCS. Further, the second transceiver 121, 140 has information indicating that the data of the first data field is coded with the first MCS and the data of the second data field is coded with the second MCS. The method further comprises performing 204 a decoding operation on the data of the first data field using the first MCS and a decoding operation on the data of the second data field using the second MCS, and selecting 206 the first MCS or the second MCS based on a result of the performed decoding operations.

The data sent in the first data field may or may not be the same data as is sent in the second data field. The data sequence may be comprised in one data frame. The selected MCS may be the MCS of the first and the second MCS for which the data was best decoded, taking the used data resources into consideration. By receiving, from a data sender, a data sequence with data in different fields coded with different MCS, the second transceiver can perform a decoding operation of the received data in the different fields coded with the different MCS and from the result of the decoding select the MCS that was most suitable for decoding the data at the moment. I.e. a most suitable MCS is selected out of one transmitted data sequence, since the data sequence comprises data coded with different MCS. Also, the decoding results of the received sequence may be used to compare to decoding results for MCS of other data sequences received from other transceivers, and to select to communicate with the transceiver that had the best MCS. Consequently, from only receiving one data sequence, a selection of suitable MCS can be made. As a result, a quick and accurate MCS selection is performed that would suit especially well for wireless devices that are not actively connected very often, such as sensor stations.

According to an embodiment, the method further comprises sending 208 to the first transceiver 130, 110 information of the selected MCS. Hereby, the first transceiver is informed of the selected MCS and can start communicating with the second transceiver using the selected MCS.

According to another embodiment, the data of the first data field and the data of the second data field are known to the second transceiver 121, 140. By transmitting known data coded by different MCS to the second transceiver, there is no need to transmit any redundant coding bits such as CRC bits since the second transceiver already knows what the data is going to be.

According to another embodiment, the information indicating that the data of the first data field is coded with the first MCS and the data of the second data field is coded with the second MCS is received from the first transceiver 110, 130 in connection with the reception of the data sequence. Thereby, the second transceiver is informed of for which data field which MCS was used. The information may be received in the preamble or header of the data sequence.

According to another embodiment, the information that the data of the first data field is coded with the first MCS and the data of the second data field is coded with the second MCS is implicitly known to the second transceiver from a predefined format of the received 202 data sequence. The second transceiver may for example read from the received signal sequence, in e.g. the header that the data sequence is a LAF type 1. Then the second transceiver has information that indicates that for a LAF type 1, data of data field one is coded with MCS1 and data of data field two is coded with MCS2. If the header indicates that it is a LAF type 2, the data of the data fields may be coded differently than for LAF type 1, e.g. data of data field one may be coded with MCS3, data of data field two with MCS2 etc.

According to another embodiment, the first transceiver 130, 110 is a base station 110 or access point, and the second transceiver 140, 121 is a wireless communication device 121, and the data sequence is preferably piggybacked to an already existing frame. The already existing frame may be a frame of a beacon signal, a frame of a fast synch signal etc.

Figure 6:
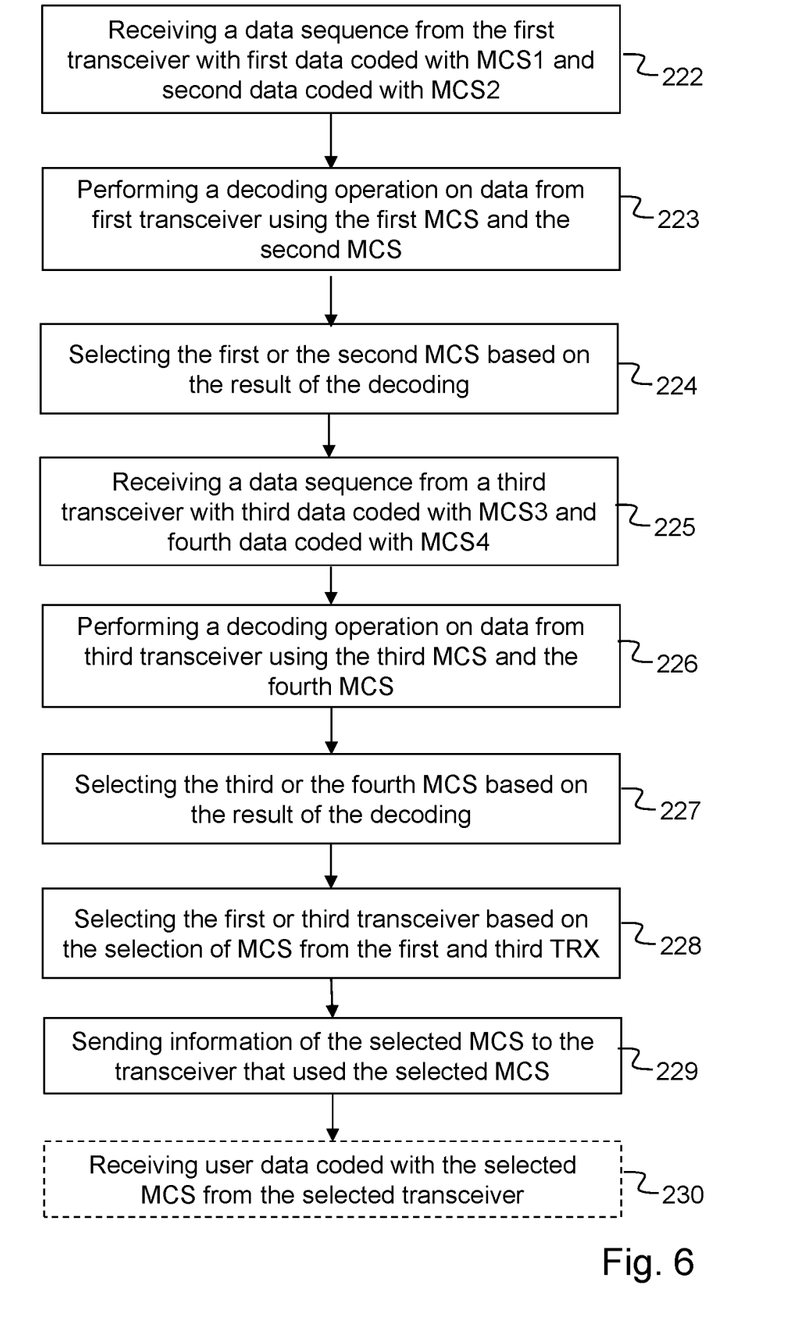
FIG. 6 is a flow chart illustrating another method performed by a second transceiver, according to possible embodiments.

FIG. 6 shows another embodiment of the above described methods. In this embodiment, the method comprises the previously mentioned steps of receiving 222, from the first transceiver 110, 130, a data sequence comprising a first data field comprising data coded with a first MCS, and a second data field comprising data coded with a second MCS different from the first MCS, performing 223 a decoding operation on the data of the first data field using the first MCS and a decoding operation on the data of the second data field using the second MCS, and selecting 224 the first MCS or the second MCS based on a result of the performed decoding operations. The method of this embodiment further comprises receiving 225, from a third transceiver 150, 120, a data sequence comprising a third data field comprising data coded with a third modulation and coding scheme, MCS, and a fourth data field comprising data coded with a fourth MCS different from the third MCS, wherein the second transceiver has information that the data of the third data field is coded with the third MCS and the data of the fourth data field is coded with the fourth MCS, performing 226 a decoding operation on the data of the third data field using the third MCS and a decoding operation on the data of the fourth data field using the fourth MCS, and selecting 227 the third MCS or the fourth MCS based on a result of the performed decoding operations of the data of the third data field and the data of the fourth data field. The method further comprises selecting 228 the first 130 or the third transceiver 150 for further communication based on the selection of MCS from the first transceiver and the selection of MCS from the third transceiver, and sending 229 to the selected transceiver information that the second transceiver selected to communicate further with the selected transceiver using the MCS selected for the selected transceiver. The method may further comprise, in response to the sending of the information of selected MCS to the selected transceiver, receiving 230 user data coded with the selected MCS, from the selected transceiver. By receiving data sequences from more than one transceiver, the second transceiver can select which of the first and the third transceiver to communicate with based on which transceiver that has the best received MCS-coded data. The third MCS may be the same MCS as the first MCS or a different MCS than any of the first or second MCS. The fourth MCS may be the same MCS as the second MCS or a different MCS than any of the first or second MCS. The selection of the first or the third transceiver for further communication is based on the selection of MCS from the first transceiver and the selection of MCS from the third transceiver, i.e. based on the result of the performed decoding operations for the selected MCS for each transceiver.

Figure 7:
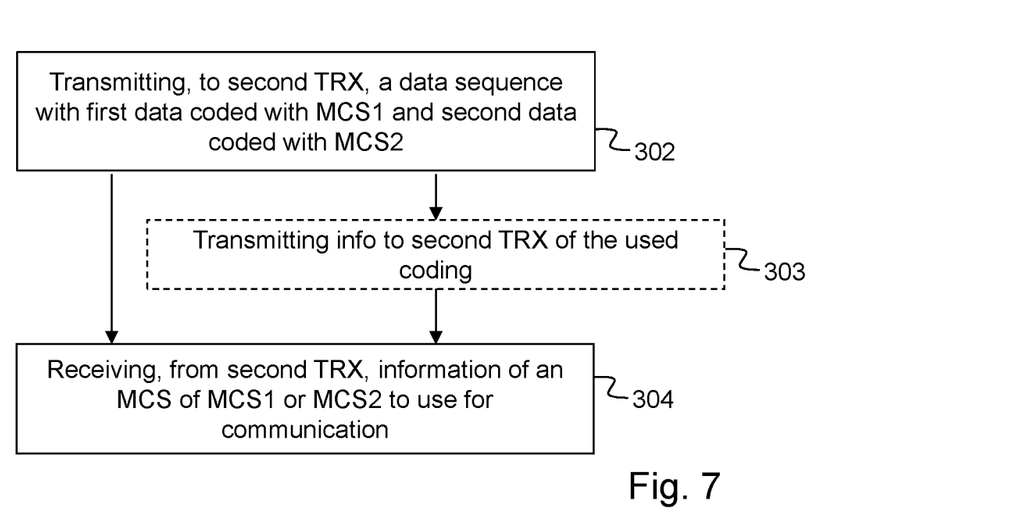
FIG. 7 is a flow chart illustrating a method performed by a first transceiver, according to possible embodiments.

FIG. 7 describes a method performed by a first transceiver 110, 130 of a packet based wireless communication network 100 for wireless communication with a second transceiver 121, 140 of the network. The method comprises transmitting 302, to the second transceiver, a data sequence comprising a first data field comprising data coded with a first MCS and a second data field comprising data coded with a second MCS different from the first MCS, and receiving 304, from the second transceiver, information of an MCS of the first MCS or the second MCS to use for communication between the first transceiver and the second transceiver. By transmitting a data sequence with data in different fields coded with different MCS, the second transceiver receiving the transmitted data sequence can use the transmitted data and try to decode the received data in the different fields and from the result of the decoding see which MCS that was most suitable for decoding the data at the moment. I.e. a most suitable MCS can be selected out of one transmitted data sequence, since the data sequence comprises data coded with different MCS. The MCS to use, of the first and the second MCS, has been selected by the second transceiver based on a decoding operation performed by the second transceiver on the data of the first data field using the first MCS and a decoding operation on the data of the second data field using the second MCS.

According to an embodiment, the method may further comprise transmitting 303 information to the second transceiver that the data of the first data field is coded with the first MCS and the data of the second data field is coded with the second MCS.

According to another embodiment, the information that the data of the first data field is coded with the first MCS and the data of the second data field is coded with the second MCS is transmitted in connection with the transmission of the data sequence.

According to another embodiment, the information that the data of the first data field is coded with the first MCS and the data of the second data field is coded with the second MCS is implicit from a predefined format of the data sequence.

According to another embodiment, the first transceiver 130 is a base station or access point, the second transceiver 140 is a wireless communication device, and the data sequence is preferably piggybacked to an already existing frame.

According to another embodiment, the data sequence is transmitted in an Aggregate Medium Access Control Protocol Data Unit, A-MPDU.

According to another embodiment, the data sequence is transmitted in an Aggregated physical layer, PHY, service data unit, A-PSDU.

According to another embodiment, a special frame called Link Adaptation Frame, LAF, is introduced. The LAF is to be used for fast link adaptation. The LAF comprises different segments each segment being coded using a different MCS. The following description is directed towards the Wifi standard 802.11 ah, however it is straight forward to consider constructions for other communication standards, such as other Wifi standards. The LAF is to be sent from a first transceiver to a second transceiver and used by the second transceiver to determine a suitable MCS to be used for communication between the first and second transceiver.

According to a first variant of the embodiment, a known data sequence is coded in the segments with different MCSs by the first transceiver and sent to the second transceiver. Observe that in this variant no cyclic redundancy check, CRC is necessary as the data sequence is known. According to a second variant of the embodiment, an Aggregate MAC protocol data unit, A-MPDU, packet is transmitted from the first transceiver to the second transceiver, where different MCSs are used for the different MPDUs of the A-MPDU packet. According to a third variant of the embodiment, a previously proposed Aggregate PHY service data unit, A-PSDU, packet is transmitted, where different MCSs are used for the different PSDUs of the A-PSDU packet. Here encapsulation is performed with individual signal, SIG, fields, delimiting the individual PSDUs.

Figure 8A:
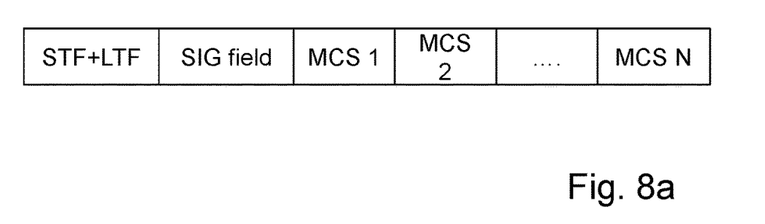
FIGS. 8a-8c are block diagrams illustrating three types of data packets according to possible embodiments.

For the first variant of this embodiment, a stand-alone packet, e.g. a PHY protocol data unit, comprising the LAF is shown in FIG. 8a. The LAF is the content of the packet after the SIG field. The packet usually starts with a Short Training Field, STF and a Long Training Field, LTF followed by the SIG field. The LAF comprises a plurality of data fields, the individual data field comprising data coded with an MCS different from the MCSs used in the other fields. In the example of FIG. 8a, in the first field of the LAF, data is coded with MCS1, in the second field data is coded with MCS2 and so on until in the Nth field data is coded with MCS N. All MCSs or a selected subset of available MCSs are used to encode separate data fields. The data and MCS for each field may be known. In 802.11ah, there are 10 supported MCSs, but the SIG field contains an MCS field of 4 bits that may then take on 15 possible values in the MCS field. Therefore, it would be advantageous in 802.11ah to use MCS 11-15 to signal the use of a LAF packet. A possible solution is to support a LAF configured so that all MCSs are used, from one and up to N. Such a LAF configuration could be coded in the SIG field with MCS 11. In other words, when MCS 11 is used in the SIG field it will be a signal to the receiver that the LAF configuration using all MCSs in order from one up to N is used for coding data in the data fields.

When using the first variant of the embodiment to piggyback the LAF to any other frame, one of the reserved bits in the SIG field of 802.11ah may be used to signal that it is a LAF frame following, and the LAF configuration, similar to the use of the MCS field above. The reserved bits in the SIG field may be e.g. B0 for SHORT preamble, B12 for LONG preamble single user, B2 for LONG preamble multiple users, and B6 for S1G_1M preamble. In the piggybacked LAF one example is to send two OFDM symbols of all MCS's in the LAF, the OFDM symbols being coded differently for different MCSs. To piggyback the LAF means to piggyback the parts after the SIG field of FIG. 8a to any packet.

Figure 8B:
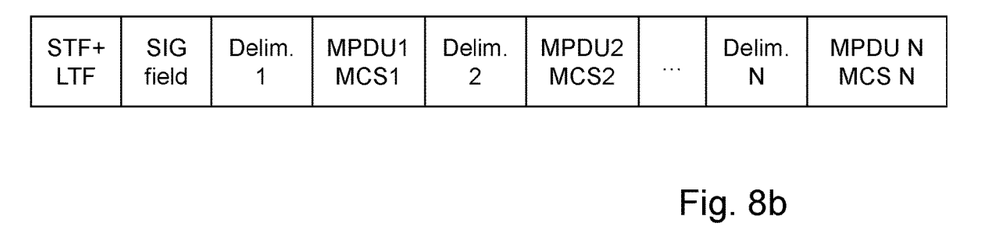

For the second variant of this embodiment, an A-MPDU is used and shown in FIG. 8b. The A-MPDU comprises an STF+LTF field followed by a SIG field followed by a plurality of MPDU fields delimited from each other by delimitation fields. In the MPDU fields data is coded with different MCSs in a similar manner as for the first variant shown in FIG. 8a. For the A-MPDU, the LAF is the fields trailing the SIG field. A variable number of MCSs can be tested in the different MPDU's transmitted. To signal the different MCSs used in the different fields, up to all three reserved bits in the MPDU delimiter may be used. In other words, the MCS used for a certain field is signaled in the delimiter that is immediately before the certain field.

Figure 8C:
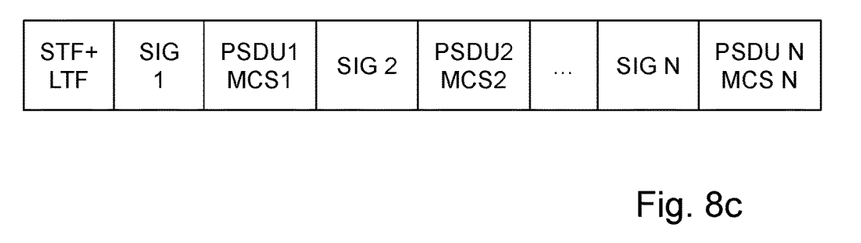

The third variant of this embodiment, comprising an A-PSDU packet, is shown in FIG. 8c. As each aggregate PSDU has a separate SIG header, the SIG delimits the individual PSDUs from each other, and useful data can be transmitted in one transmission burst. Further, since each aggregate field has its own SIG, it may be signaled in the SIG field of the individual field which MCS that is used for each field, and therefore there is no need to introduce any additional signaling information.

Example of use cases for LAF. The LAF could be useful in many scenarios where knowing the link quality is of importance. The standard problem of MCS selection has already been mentioned.

Figure 9:
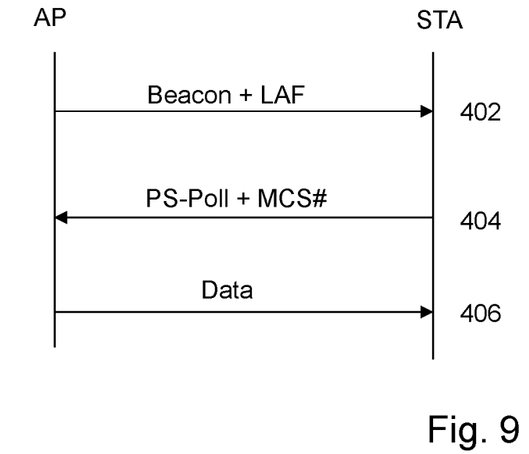
FIG. 9 is a signaling diagram illustrating a method according to possible embodiments.

According to one use case example, the LAF can be attached to a beacon frame sent from an access point, AP to a wireless station, STA. In the beacon frame, there is typically also a traffic indication map, TIM, which lists the STAs that have data ready for download. In order for the AP to send the data to the STAs, the STAs have to reply with a Power Save poll, PS-poll, frame. The PS-poll frame contains a frame control field, which in turn contains the MCS feedback field. Using the LAF piggybacked to the beacon as described, i.e. by performing a decoding operation on the data of the LAF using the indicated MCSs, the STA can in response send to the AP in the PS-poll the highest MCS it managed to decode. In this scenario the only added overhead compared to a legacy approach is the slightly larger beacon frame. In return, the optimal MCS may be detected for the data to be transmitted. FIG. 9 shows how this exchange may take place. FIG. 9 comprises the steps of sending 402, from the AP to the STA, a beacon frame comprising a LAF, e.g. any of the LAF variants indicated in FIGS. 8a-c, and, based on decoding operations performed by the STA of the data of the LAFs, sending 404 from the STA to the AP, a PS-Poll comprising the selected MCS in the MCS feedback field. In return, the AP sends 406 data to the STA coded with the selected MCS. According to an embodiment, a receiver may always use the best MCS choice from the decoding operation and send the MCS choice in the MCS feedback field, whenever the LAF was transmitted.

Figure 10:
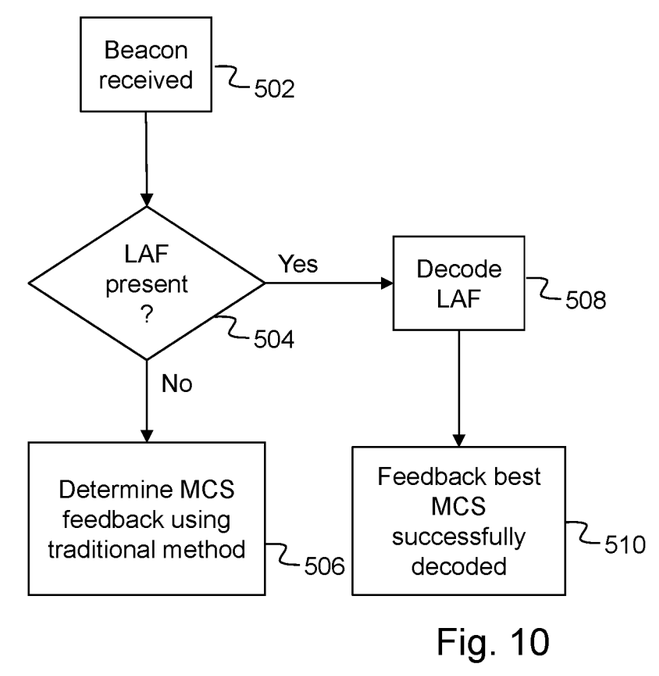
FIG. 10 is a flow chart illustrating a method according to possible embodiments.

FIG. 10 describes an embodiment of a method performed in a receiver, according to the example above. The methods starts by the receiver receiving a beacon signal 502. The receiver checks 504 whether there is a LAF present, e.g. in any SIG field. If there is no LAF present, the receiver determines 506 and feedbacks MCS using a traditional method. If there is a LAF present, the receiver performs 508 decoding operations on the LAF, using the MCSs indicated for the different fields, and feedback 510 to the AP the best MCS that was successfully decoded, e.g. in the MCS feedback field.

According to another use case example, the LAF can be used in the Ready To Send/Clear To Send, RTS/CTS, exchange. If a transmitter wants to transmit data to a receiver, the RTS frame may be sent from the transmitter. The receiver replies with CTS when the receiver is ready to receive data. By piggybacking the LAF to the RTS, the receiver may in the MCS feedback field of the CTS, reply with the highest MCS it managed to decode.

According to another use case, the LAF can be attached to the fast sync frame. For sensor STAs being asleep for large periods of time, a mechanism in Wifi 802.11ah is the target wake time, TWT. In this scenario, the AP and the STA agree on a certain time the STA will wake up. At this time, the AP may send a fast sync frame to reduce synchronization time needed for the STA. By piggybacking the LAF to a sync frame, the STA may reply immediately with an ACK containing the MCS feedback field.

According to another use case, the LAF may be used for AP selection, in any Wifi standard, or for Relay selection, in Wifi 802.11ah. In this case the LAF may be piggybacked to the beacon from each AP sending signals towards an STA. Then the STA have the option to associate with the AP/Relay promising the best MCS for downlink data. For more details, see the method described in FIG. 6.

According to another use case, the LAF may be attached to the association, and/or re-association request frame. Assuming, for example the use case above that the STA is to select an AP. The STA may then send an association request to a few of the most promising AP/Relays. By piggybacking the LAF to the association request, the AP/Relay can decide if it should let the STA associate or not, and possibly with which MCS to communicate.

According to another use case, the LAF may be useful in the case of channel/sub-channel selection. Instead of attempting to estimate some link quality parameters, the selection choice can be based on which channel/sub-channel that has the condition to allow for the best MCS.

According to an embodiment, known or unknown data is sent from a first transceiver to a second transceiver in one transmission burst, i.e. as a LAF, the data being coded using several different MCSs. The LAF is then received by the second transceiver and the second transceiver performs a decoding operation on the data by using the different MCSs, and selects the most suitable MCS of the different MCS based on the result of the decoding and sends the selected MCS, in e.g. the MCS feedback field, back to the first transceiver.

Figure 11:
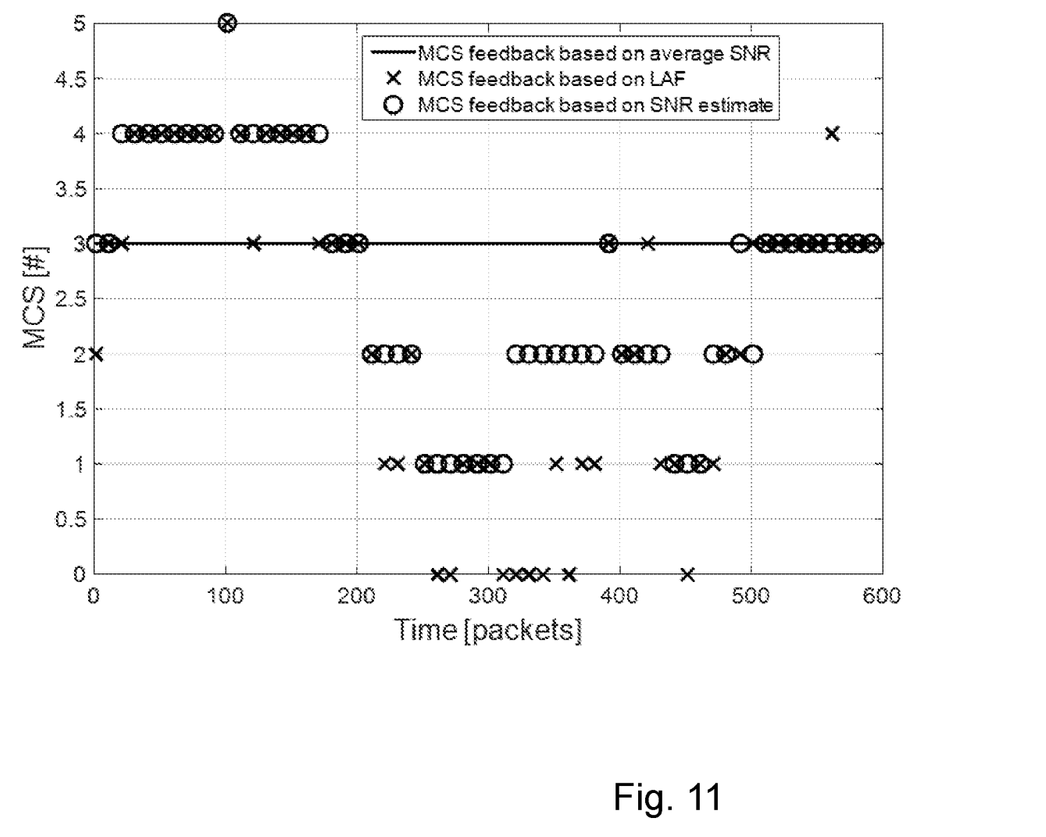
FIG. 11 is an x-y diagram illustrating an MCS to use over time according to two prior art methods compared to the method of possible embodiments.

An advantage of at least some of the proposed solutions is that the LAF transmission provides the receiver the required information, e.g., the achievable throughputs, for choosing an optimal MCS matched to the propagation conditions by the receiver only receiving one frame from the transmitter. Note here, that since the receiver actually tries to decode each MCS, no estimation method can produce a more accurate estimate than this. Therefore, if a sensor station wakes up, it can, after sending one LAF packet, and get the MCS feedback back from the AP, instantly know which MCS to choose. Another advantage with the LAF is its simplicity; it is clear what it does, how it does it and how to implement it. In FIG. 11, the MCS feedback is shown estimated based on SNR estimation, SNR average, and finally LAF. It is clear that LAF may provide significant gains in practice. As can be seen from FIG. 11, for instance for the packet interval 300-400, there are many points for which the "MCS feedback based on LAF" is either 0 or 1, whereas the "MCS feedback based on SNR estimate" suggests 2 and "MCS feedback based on average SNR" suggests 3. As the LAF was actually decoded it can be considered as reflecting the actual condition. Consequently, if MCS 2 or MCS 3 is selected, and the actual decoding (using LAF) suggests lower MCS, the packet may be lost.

Figure 12:
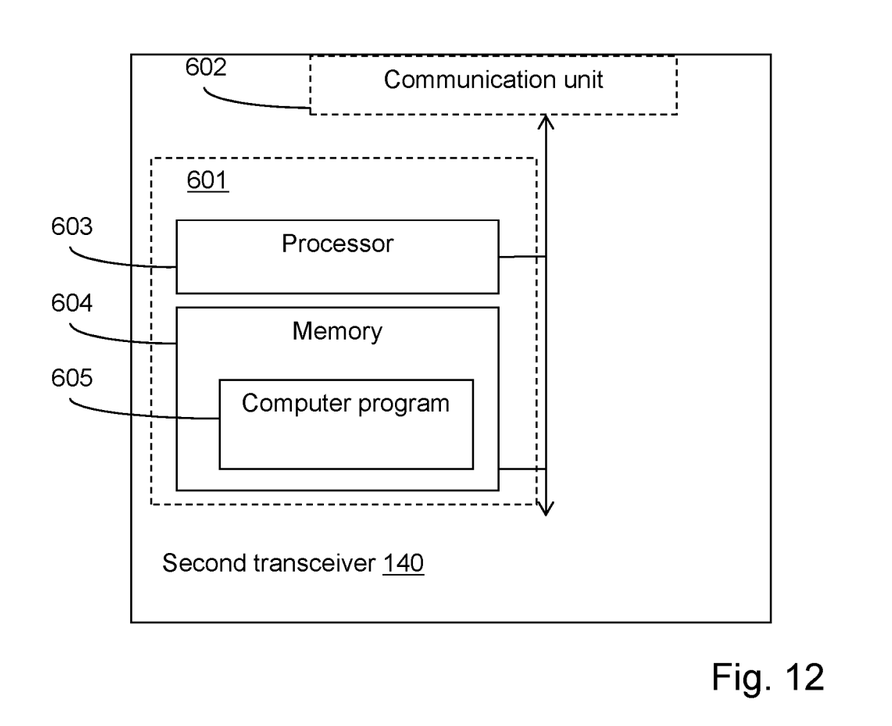
FIGS. 12-13 are block diagrams illustrating a second transceiver in more detail, according to further possible embodiments.

FIG. 12, in conjunction with FIG. 3, describes an embodiment of a second transceiver 140 operable in a packet based wireless communication network 100 configured for wireless communication with a first transceiver 130 of the network. The second transceiver 140 comprises a processor 603 and a memory 604. The memory contains instructions executable by said processor, whereby the second transceiver 140 is operative for receiving, from the first transceiver 130, a data sequence comprising a first data field comprising data coded with a first modulation and coding scheme, MCS, and a second data field comprising data coded with a second MCS different from the first MCS, wherein the second transceiver 140 has information indicating that the data of the first data field is coded with the first MCS and the data of the second data field is coded with the second MCS. The second transceiver is further operative for performing a decoding operation on the data of the first data field using the first MCS and a decoding operation on the data of the second data field using the second MCS, and selecting the first MCS or the second MCS based on a result of the performed decoding operations.

According to an embodiment, the second transceiver is further operative for sending to the first transceiver 130 information of the selected MCS.

According to another embodiment, the data of the first data field and the data of the second data field are known to the second transceiver 140.

According to another embodiment, the second transceiver is arranged to receive the information indicating that the data of the first data field is coded with the first MCS and the data of the second data field is coded with the second MCS from the first transceiver 130 in connection with the reception of the data sequence.

According to another embodiment, the information that the data of the first data field is coded with the first MCS and the data of the second data field is coded with the second MCS is implicitly known to the second transceiver from a predefined format of the received data sequence.

According to another embodiment, the second transceiver is further operative for receiving, from a third transceiver 150, a data sequence comprising a third data field comprising data coded with a third modulation and coding scheme, MCS, and a fourth data field comprising data coded with a fourth MCS different from the third MCS, wherein the second transceiver has information that the data of the third data field is coded with the third MCS and the data of the fourth data field is coded with the fourth MCS, performing a decoding operation on the data of the third data field using the third MCS and a decoding operation on the data of the fourth data field using the fourth MCS, and selecting the third MCS or the fourth MCS based on a result of the performed decoding operations of the data of the third data field and the data of the fourth data field. The second transceiver may further be operative for selecting the first transceiver 130 or the third transceiver 150 for further communication based on the selection of MCS from the first transceiver and the selection of MCS from the third transceiver, and sending to the selected transceiver information that the second transceiver selected to communicate further with the selected transceiver using the MCS selected for the selected transceiver.

According to other embodiments, the second transceiver 140 may further comprise a communication unit 602, which may be considered to comprise conventional means for communicating from and/or to other nodes in the wireless network 100, such as base stations/access points or wireless communication devices/stations. The communication unit 602 may comprise transmitting units for transmitting wireless signals and receiving units for receiving wireless signals. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the actions and/or methods mentioned above.

Figure 13:
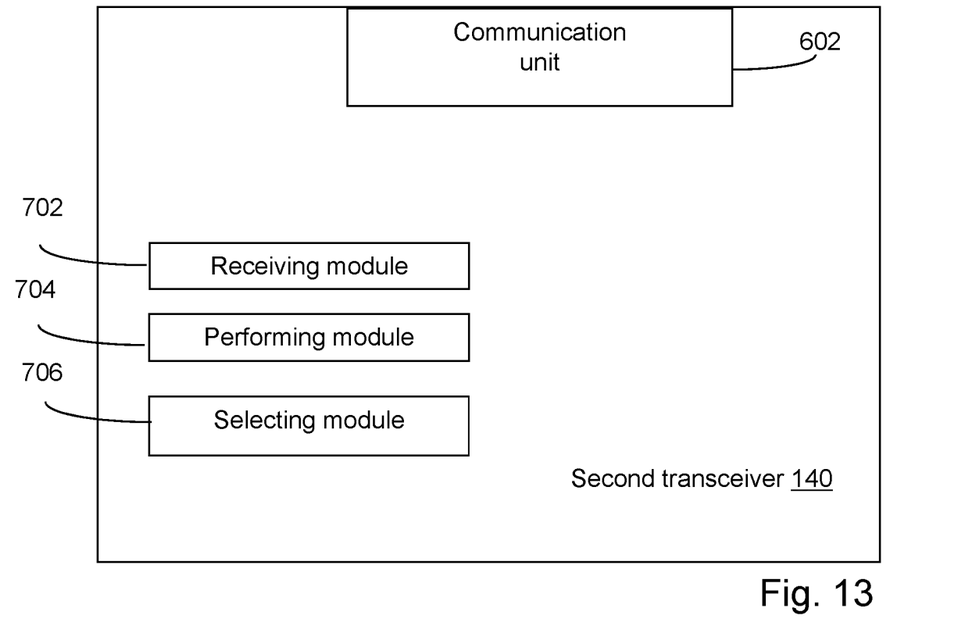

FIG. 13 in conjunction with FIG. 3 describes another embodiment of a second transceiver 140 operable in a packet based wireless communication network 100 configured for wireless communication with a first transceiver 130 of the network. The second transceiver 140 comprises a receiving module 702 for receiving, from the first transceiver 130, a data sequence comprising a first data field comprising data coded with a first modulation and coding scheme, MCS, and a second data field comprising data coded with a second MCS different from the first MCS, wherein the second transceiver 140 has information indicating that the data of the first data field is coded with the first MCS and the data of the second data field is coded with the second MCS. The second transceiver 140 further comprises a performing module 704 for performing a decoding operation on the data of the first data field using the first MCS and a decoding operation on the data of the second data field using the second MCS, and a selecting module 706 for selecting the first MCS or the second MCS based on a result of the performed decoding operations. The second transceiver 140 may further comprise a communication unit 602 similar to the communication unit of FIG. 12.

Figure 14:
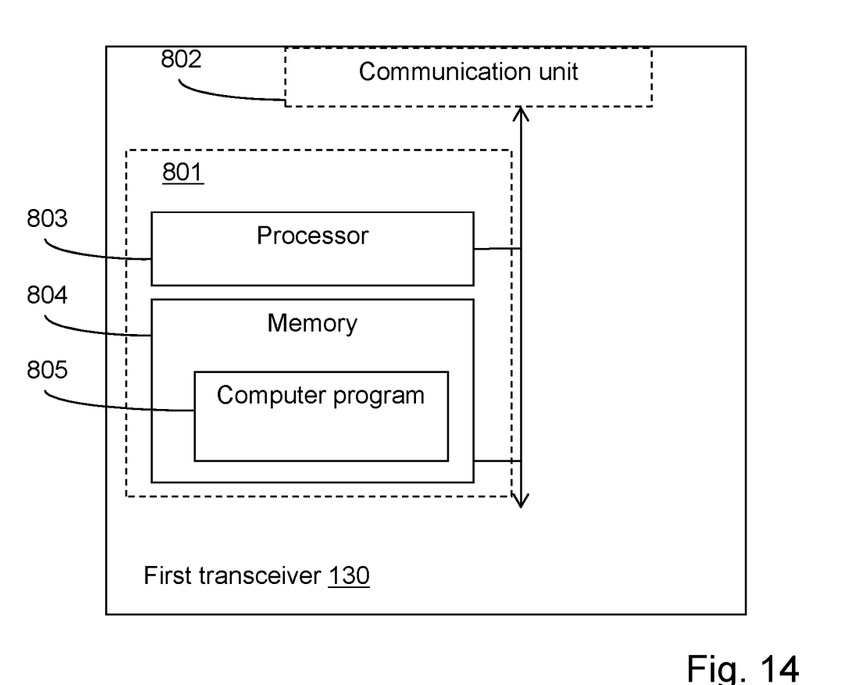
FIGS. 14-15 are block diagrams illustrating a first transceiver in more detail, according to further possible embodiments.

FIG. 14 in conjunction with FIG. 3 describes an embodiment of a first transceiver 130 operable in a packet based wireless communication network 100 configured for wireless communication with a second transceiver 140 of the network. The first transceiver 130 comprises a processor 803 and a memory 804. The memory contains instructions executable by said processor, whereby the first transceiver 130 is operative for transmitting, to the second transceiver, a data sequence comprising a first data field comprising data coded with a first modulation and coding scheme, MCS, and a second data field comprising data coded with a second MCS different from the first MCS, and receiving, from the second transceiver, information of an MCS of the first MCS or the second MCS to use for communication between the first transceiver and the second transceiver.

According to an embodiment, the first transceiver is further operative for transmitting information to the second transceiver that the data of the first data field is coded with the first MCS and the data of the second data field is coded with the second MCS.

According to another embodiment, the first transceiver is operative for transmitting the information that the data of the first data field is coded with the first MCS and the data of the second data field is coded with the second MCS in connection with the transmission of the data sequence.

According to another embodiment, the information that the data of the first data field is coded with the first MCS and the data of the second data field is coded with the second MCS is implicit from a predefined format of the data sequence.

According to another embodiment, the data sequence is transmitted in an A-MPDU, or in an A-PSDU.

According to other embodiments, the first transceiver 130 may further comprise a communication unit 802, which may be considered to comprise conventional means for communicating from and/or to other nodes in the wireless network 100, such as base stations/access points or wireless communication devices/stations. The communication unit 802 may comprise transmitting units for transmitting wireless signals and receiving units for receiving wireless signals. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

Figure 15:
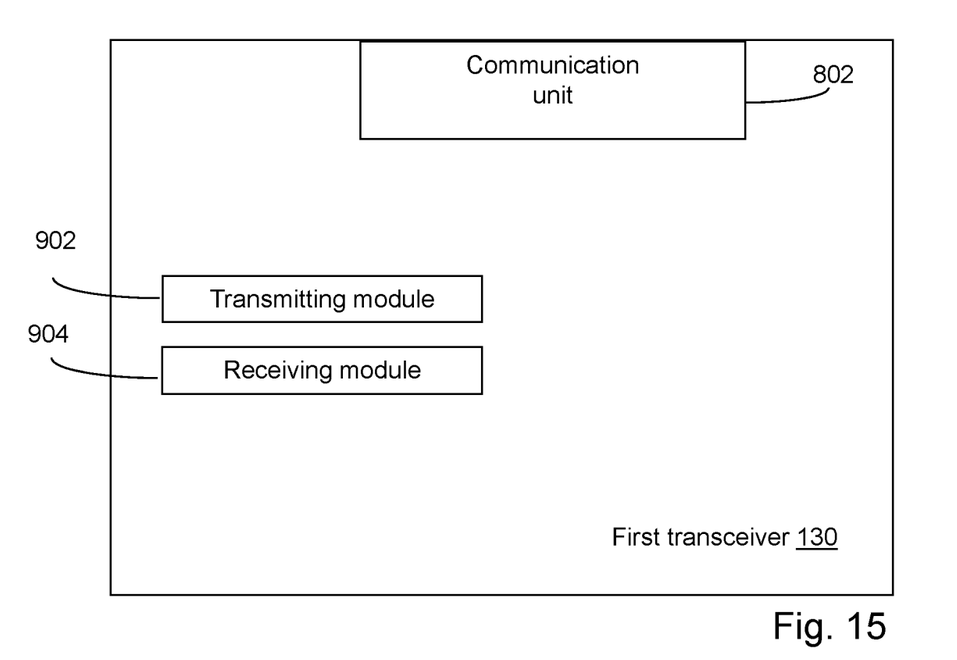

FIG. 15 in conjunction with FIG. 3 describes a first transceiver 130 operable in a packet based wireless communication network 100 configured for wireless communication with a second transceiver 140 of the network. The first transceiver 130 comprises a transmitting module 902 for transmitting, to the second transceiver, a data sequence comprising a first data field comprising data coded with a first modulation and coding scheme, MCS, and a second data field comprising data coded with a second MCS different from the first MCS, and a receiving module 904 for receiving, from the second transceiver, information of an MCS of the first MCS or the second MCS to use for communication between the first transceiver and the second transceiver. The first transceiver 130 may also comprise a communication unit 802 similar to the communication unit 802 of FIG. 14.

The computer programs 605 and 805 may respectively comprise computer readable code means, which when run in second transceiver 140/the first transceiver 130 causes the second/first transceiver to perform the steps described in any of the described embodiments of the respective second/first transceiver. The respective computer program 605; 805 may be carried by a computer program product connectable to the respective processor 603; 803. The computer program product may be the memory 604; 804. The memory 604; 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the respective program could be downloaded into the respective memory 604; 804. Alternatively, the respective computer program may be stored on a server or any other entity connected to the communication network to which the first/second transceiver has access via the communication unit 602; 802 of the respective first/second transceiver. The computer program may then be downloaded from the server into the memory 604; 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally means that what is within the broken line is optional.

The invention claimed is:

1. A method performed by a second transceiver of a packet-based wireless communication network for wireless communication with a first transceiver of the network, the method comprising:

receiving, from the first transceiver, a data sequence comprising a first data field comprising data coded with a first modulation and coding scheme (MCS) and a second data field comprising data coded with a second MCS different from the first MCS, wherein the second transceiver has information indicating that the data of the first data field is coded with the first MCS and the data of the second data field is coded with the second MCS;

performing a decoding operation on the data of the first data field using the first MCS and a decoding operation on the data of the second data field using the second MCS; and selecting the first MCS or the second MCS based on a result of the performed decoding operations;

wherein the method further comprises:

receiving, from a third transceiver, a data sequence comprising a third data field comprising data coded with a third modulation and coding scheme (MCS) and a fourth data field comprising data coded with a fourth MCS different from the third MCS, wherein the second transceiver has information indicating that the data of the third data field is coded with the third MCS and the data of the fourth data field is coded with the fourth MCS;

performing a decoding operation on the data of the third data field using the third MCS and a decoding operation on the data of the fourth data field using the fourth MCS;

selecting the third MCS or the fourth MCS based on a result of the performed decoding operations of the data of the third data field and the data of the fourth data field;

selecting the first transceiver or the third transceiver for further communication based on the selection of MCS from the first transceiver and the selection of MCS from the third transceiver; and sending, to the selected transceiver, information indicating that the second transceiver selected to communicate further with the selected transceiver using the MCS selected for the selected transceiver.

2. The method of claim 1, further comprising:

sending to the first transceiver information of the selected MCS.

3. The method of claim 1, wherein the data of the first data field and the data of the second data field are known to the second transceiver.

4. A second transceiver operable in a packet-based wireless communication network configured for wireless communication with a first transceiver of the network, the second transceiver comprising:
   a processor; and
   a memory operatively coupled to the processor, said memory containing instructions executable by said processor whereby the second transceiver is configured to:
      receive, from the first transceiver, a data sequence comprising a first data field comprising data coded with a first modulation and coding scheme (MCS) and a second data field comprising data coded with a second MCS different from the first MCS, wherein the second transceiver has information indicating that the data of the first data field is coded with the first MCS and the data of the second data field is coded with the second MCS;
      perform a decoding operation on the data of the first data field using the first MCS and a decoding operation on the data of the second data field using the second MCS; and
      select the first MCS or the second MCS based on a result of the performed decoding operations;
wherein the memory contains instructions executable by said processor whereby the second transceiver is further configured to:
      receive, from a third transceiver, a data sequence comprising a third data field comprising data coded with a third modulation and coding scheme (MCS) and a fourth data field comprising data coded with a fourth MCS different from the third MCS, wherein the second transceiver has information that the data of the third data field is coded with the third MCS and the data of the fourth data field is coded with the fourth MCS;
      perform a decoding operation on the data of the third data field using the third MCS and a decoding operation on the data of the fourth data field using the fourth MCS;
      select the third MCS or the fourth MCS based on a result of the performed decoding operations of the data of the third data field and the data of the fourth data field;
      select the first transceiver or the third transceiver for further communication based on the selection of MCS from the first transceiver and the selection of MCS from the third transceiver; and
      send, to the selected transceiver, information indicating that the second transceiver selected to communicate further with the selected transceiver using the MCS selected for the selected transceiver.

5. The second transceiver of claim 4, further being configured to send, to the first transceiver, information of the selected MCS.

6. The second transceiver of claim 4, wherein the data of the first data field and the data of the second data field are known to the second transceiver.

7. The second transceiver of claim 4, wherein the second transceiver is configured to receive the information indicating that the data of the first data field is coded with the first MCS and the data of the second data field is coded with the second MCS from the first transceiver in connection with the reception of the data sequence.

8. The second transceiver of claim 4, wherein the information that the data of the first data field is coded with the first MCS and the data of the second data field is coded with the second MCS is implicitly known to the second transceiver from a predefined format of the received data sequence.

* * * * *